(12) United States Patent
Yang et al.

(10) Patent No.: US 9,834,206 B1
(45) Date of Patent: Dec. 5, 2017

(54) FAULT-TOLERANT OPERATION OF HYBRID ELECTRIC VEHICLE

(71) Applicant: Ford Global Technologies, LLC, Dearborn, MI (US)

(72) Inventors: Shuitao Yang, Dearborn Heights, MI (US); Yan Zhou, Canton, MI (US); Kevin L. Newman, Farmington Hills, MI (US); Lihua Chen, Farmington Hills, MI (US); Fan Xu, Novi, MI (US); Mohammed Khorshed Alam, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/472,718

(22) Filed: Mar. 29, 2017

(51) Int. Cl.
*B60W 20/50* (2016.01)
*B60W 10/06* (2006.01)
(Continued)

(52) U.S. Cl.
CPC .............. *B60W 20/50* (2013.01); *B60K 1/04* (2013.01); *B60L 11/08* (2013.01); *B60L 11/1861* (2013.01); *B60L 11/1864* (2013.01); *B60W 10/06* (2013.01); *B60W 10/08* (2013.01); *B60W 10/115* (2013.01); *H02M 7/5387* (2013.01); *H02P 27/06* (2013.01); *B60K 6/28* (2013.01); *B60K 6/365* (2013.01); *B60L 7/14* (2013.01); *B60L 11/1803* (2013.01); *B60L 2210/42* (2013.01); *B60L 2240/423* (2013.01); *B60L 2240/441* (2013.01); *B60L 2240/526* (2013.01); *B60L 2240/527* (2013.01);
(Continued)

(58) Field of Classification Search
CPC . B60L 11/1861; B60L 11/1864; B60W 20/50; B60W 10/06; B60W 10/08; B60W 10/115; H02P 27/06
See application file for complete search history.

(56) References Cited

U.S. PATENT DOCUMENTS 5,414,339 A * 5/1995 Masaki ................... B60L 3/003
318/139
6,275,398 B1 8/2001 Sumimoto et al.
(Continued)

FOREIGN PATENT DOCUMENTS

RU 2297639 C1 3/2005

*Primary Examiner* — Erez Gurari
(74) *Attorney, Agent, or Firm* — David B. Kelley; MacMillan, Sobanski & Todd, LLC (57) ABSTRACT

A hybrid drive system has a battery and a combustion engine for energy sources. The system has a traction motor, a generator, a variable voltage converter (VVC), a motor inverter, a generator inverter, a bus coupling the VVC to the inverters, and a controller. The controller regulates engine speed, motor torque, and generator torque. The engine speed is determined according to a driver torque demand. In normal conditions, 1) the controller regulates the engine speed by modifying a generator torque command, and 2) the bus voltage is regulated using the VVC and battery. When the controller detects a fault in which the battery and VVC become unavailable for regulating the bus voltage, then the controller regulates a motor inverter power output to match a sum of a generator inverter power output and an estimated power loss of the inverters in order to regulate the bus voltage.

12 Claims, 8 Drawing Sheets

(51) Int. Cl.
*B60W 10/08* (2006.01)
*B60L 11/18* (2006.01)
*B60K 1/04* (2006.01)
*B60W 10/115* (2012.01)
*H02M 7/5387* (2007.01)
*H02P 27/06* (2006.01)
*B60L 11/08* (2006.01)
*B60L 7/14* (2006.01)
*B60K 6/28* (2007.10)
*B60K 6/365* (2007.10)

(52) U.S. Cl.
CPC .............. *B60L 2240/547* (2013.01); *B60W 2510/0638* (2013.01); *B60W 2510/083* (2013.01); *B60W 2510/244* (2013.01); *B60W 2710/0644* (2013.01); *B60W 2710/083* (2013.01); *B60W 2710/244* (2013.01); *B60Y 2200/92* (2013.01); *Y10S 903/907* (2013.01); *Y10S 903/91* (2013.01); *Y10S 903/93* (2013.01)

(56) References Cited

U.S. PATENT DOCUMENTS

| | | |
|---|---|---|
| 7,686,723 B2 | 3/2010 | Schondort |
| 8,425,377 B2 | 4/2013 | Liang et al. |
| 8,508,066 B2 | 8/2013 | Lee et al. |
| 8,965,618 B2 * | 2/2015 | Isayeva .................... H02H 7/09 180/65.285 |
| 9,087,418 B2 * | 7/2015 | Luedtke .................. G07C 5/00 |
| 9,106,162 B2 | 8/2015 | Isayeva et al. |
| 9,302,588 B2 | 4/2016 | Zhang et al. |
| 9,448,135 B2 * | 9/2016 | Syed ................... G01M 15/042 |
| 9,766,052 B2 * | 9/2017 | Degner .................. G01B 7/003 |
| 2001/0009147 A1 * | 7/2001 | Takashima ............. B60K 6/445 123/406.14 |
| 2001/0041952 A1 * | 11/2001 | Nada ...................... B60K 6/445 701/22 |
| 2001/0048226 A1 * | 12/2001 | Nada ....................... F02N 11/04 290/40 C |
| 2014/0001985 A1 * | 1/2014 | Zhang .................... B60L 3/003 318/139 |
| 2014/0062348 A1 * | 3/2014 | Isayeva ................ B60L 3/0061 318/139 |
| 2014/0062349 A1 * | 3/2014 | Isayeva ................ B60K 6/445 318/139 |
| 2014/0252849 A1 * | 9/2014 | Rao ........................ B60R 16/02 307/10.1 |
| 2015/0065026 A1 * | 3/2015 | Dawson ............. B60H 1/00385 454/75 |
| 2015/0149005 A1 * | 5/2015 | Luedtke .................. B60L 15/20 701/22 |
| 2015/0198673 A1 * | 7/2015 | Yang .................. H01M 6/5083 429/61 |
| 2015/0211887 A1 * | 7/2015 | Luedtke .................. H02P 13/00 324/207.25 |
| 2017/0246962 A1 * | 8/2017 | Weber ................ B60L 11/1846 |

* cited by examiner

FAULT-TOLERANT OPERATION OF HYBRID ELECTRIC VEHICLE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to powersplit hybrid vehicle drive systems, and, more specifically, to operation of the drive after a fault occurs in the connection to or functioning of the battery and/or variable voltage converter.

One type of hybrid electric vehicle powertrain is the powersplit drive system of the type disclosed in U.S. Pat. No. 8,425,377 and U.S. Pat. No. 7,686,723, both incorporated herein by reference. The powersplit drive system has two sources of power. The first source includes an internal combustion engine and the second source is a combination of an electric motor, a generator, and a storage device such as a battery pack. Engine power is divided into two power flow paths at any generator speed and vehicle speed. Engine speed is controlled by the generator, whereby the engine speed can be decoupled from the vehicle speed within the allowed speed range of the generator. This mode of operation is called positive powersplit when the generator is generating electrical power using mechanical power input from the engine.

Because of the mechanical properties of the planetary gearset, the generator can distribute power to the planetary gearset to drive the vehicle. This mode of operation is called "negative powersplit". The combination of a generator, a motor and a planetary gearset thus can be considered to have electrical continuously variable transmission (e-CVT) characteristics.

A generator brake can be activated so that engine output power is transmitted with a fixed gear ratio to the torque output side of the powertrain through a mechanical path only. The first power source can only produce forward propulsion of the vehicle since there is no reverse gear. The engine requires either generator control or application of a generator brake to transmit output power for forward drive. When the second power source is active, the electric motor draws power from the battery and drives the vehicle independently of the engine for both forward drive and reverse drive. In addition, the generator can draw power from the battery and drive against a one way clutch on the engine power output shaft to propel the vehicle in a forward direction. This mode of operation is called "generator drive mode". A vehicle system controller coordinates the two power sources so that they work together seamlessly to meet a driver's torque demand without exceeding powertrain system limits. The vehicle system controller allows continuous regulation of engine speed for any given vehicle speed and power request. The mechanical power flow path provides efficient power delivery through the planetary gearset to the driveshaft.

By optimizing operation of the internal combustion engine (ICE) and by implementing regenerative braking, a hybrid electric vehicle with the powersplit architecture significantly improves fuel economy. Because of the large number of additional vehicle components (e.g., variable voltage converter (VVC), motor inverter, generator inverter, battery, motor, and generator), however, overall system cost is increased and additional concerns over vehicle reliability and durability are introduced.

Fault conditions that should be monitored for include electrical faults such as a malfunction of the VVC, the battery, the battery contactors (i.e., relays), or cables which interrupt the flow of electrical power into or out of the battery. Any of these malfunctions would block in ability of the VVC to regulate the voltage level on the high voltage (HV) bus between the VVC and the inverters. Consequently, a significant overvoltage could appear at the HV bus. To prevent such an overvoltage, detection of one of these faults has been used to trigger a shutdown of the vehicle drive system. It would be desirable to obtain a fault-tolerant operation wherein a shutdown of the vehicle drive is avoided during a VVC fault. It is further desirable to achieve such fault-tolerant operation without incurring a significant increase in system cost.

SUMMARY OF THE INVENTION

In one aspect of the invention, a hybrid drive system comprises a DC power source, an internal combustion engine, a traction motor, a generator, a variable voltage converter (VVC) selectably coupled to the battery, a motor inverter, a generator inverter, a bus coupling an output of the VVC to the inverters, and a controller regulating an engine speed, a motor torque, and a generator torque. The regulated engine speed is determined according to a driver torque demand. The controller detects a fault in which the battery and VVC are unavailable for regulating a bus voltage on the bus. Upon detecting the fault, the controller regulates a motor inverter power output to match a sum of a generator inverter power output and an estimated power loss of the inverters. As a result, the bus voltage is maintained at a reference level even though the battery and VVC are unavailable, and vehicle operation can continue using engine power alone.

DETAILED DESCRIPTION OF PREFERRED EMBODIMENTS

Figure 1:
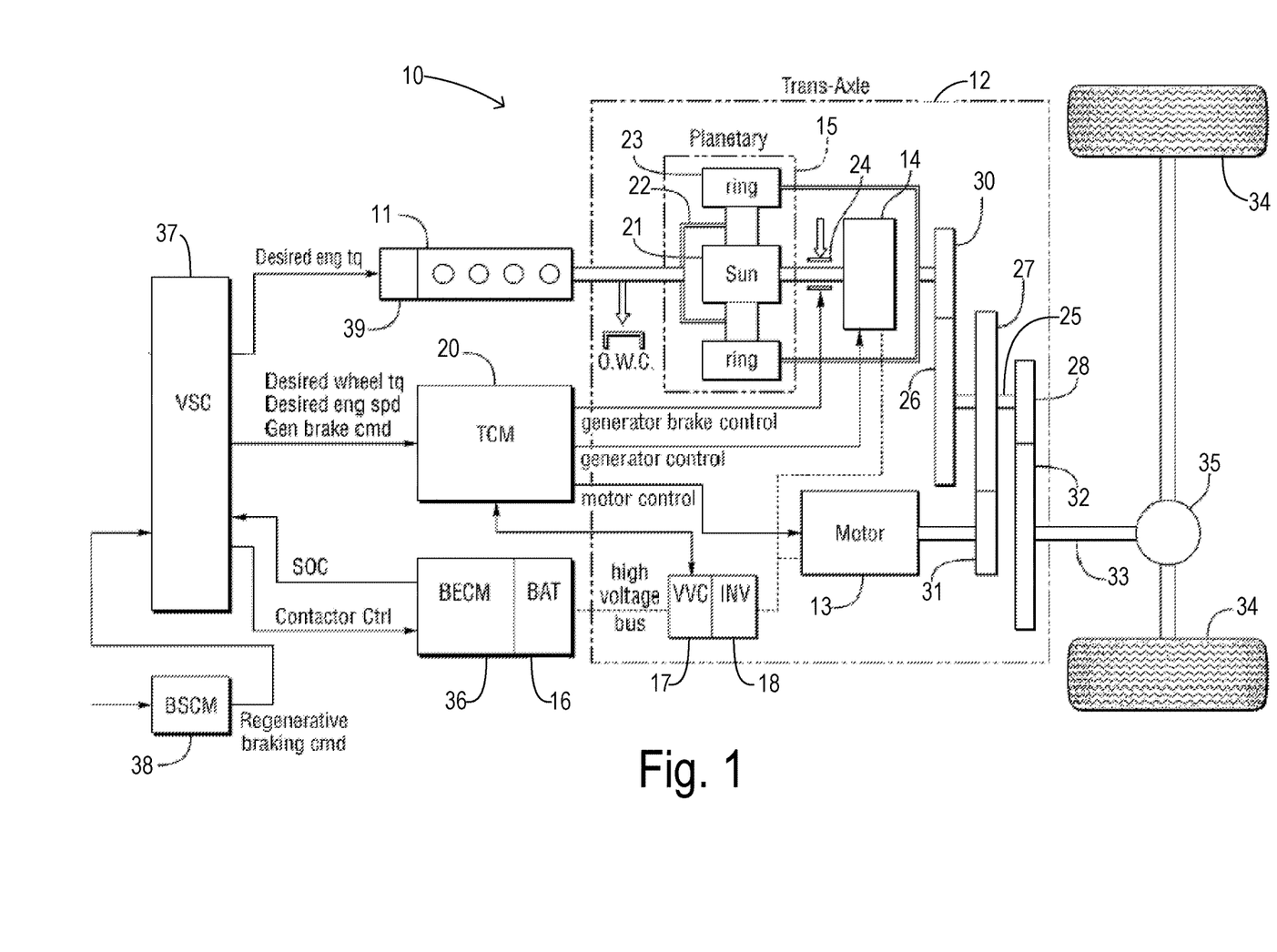
FIG. 1 is a block diagram showing a vehicle with a powersplit hybrid electric drive system.

Referring to FIG. 1, a hybrid electric vehicle 10 includes an internal combustion engine 11 and a transaxle 12 containing a traction motor 13, generator 14, and planetary gearset 15. Motor 13 receives electrical power from a battery pack 16 via a VVC 17 and inverters 18, and provides drive torque for vehicle propulsion under control of a transmission control module (TCM) 20. Motor also functions as a generator for converting mechanical power into electrical power through regenerative braking.

Transaxle 12 has a powersplit configuration wherein motor 13 and generator 14 interact with ICE 11 via planetary gearset 15 which includes a sun gear 21, a planet carrier 22, and a ring gear 23. Sun gear 21 is connected to an output shaft of generator 14 for receiving generator torque. Planet carrier 22 is connected to an output shaft of ICE 11 for receiving engine torque. Planetary gearset 15 combines the generator torque and the engine torque and provides a combined output torque at ring gear 23. Transaxle 12 may also include a one-way clutch OWC and a generator brake 24 as known in the art.

Transaxle 12 includes a countershaft 25 having a first gear 26, a second gear 27, and a third gear 28. Planetary output gear 30 is connected to ring gear 23 and meshes with first gear 26 for transferring torque between planetary gearset 15 and countershaft 25. An output gear 31 is connected to an output shaft of motor 13 and meshes with second gear 27 for transferring torque between motor 13 and countershaft 25. A transmission output gear 32 is connected to a transmission output shaft 33. Output shaft 33 is coupled to a pair of driven wheels 34 through a differential 35. Transmission output gear 32 meshes with third gear 28 for transferring torque between transaxle 12 and driven wheels 34.

Battery 16 is a high voltage battery that is capable of outputting electrical power to operate motor 13 and generator 14. Battery 16 also receives electrical power from motor 13 and generator 14 when they are operating as generators. Typically, battery 16 is a battery pack made up of several battery modules (not shown), wherein each battery module contains a plurality of battery cells (not shown). Other types of energy storage devices can also be used, such as capacitors and fuel cells (not shown) that supplement or replace battery 16.

A battery energy control module (BECM) 36 receives input signals that are indicative of vehicle and battery conditions, such as battery temperature, voltage and current. BECM 36 calculates and estimates battery parameters, such as battery state of charge and the battery power capability. VVC 17 and inverters 18 are electrically connected between battery 16 and motor 13 and generator 14. Depending on instantaneous operating mode of the drive system, VVC 17 pushes power from battery 16 to a high voltage (HV) DC bus for conversion by inverters 18 or from the HV DC bus to battery 16, whereby the DC voltage on the bus is maintained within a desired range. TCM 20 controls motor 13, generator 14, VVC 17, and inverters 18.

Vehicle 10 includes a vehicle system controller (VSC) 37 that communicates with other vehicle systems and controllers for coordinating their function. Although it is shown as a single controller, the VSC 37 may include multiple controllers that may be used to control multiple vehicle systems according to an overall vehicle control logic, or software. VSC 37 communicates with other vehicle systems and controllers (e.g., BECM 36 and TCM 20) over one or more communication buses (e.g., a CAN bus). VSC 37 receives a demand torque input (not shown) from a driver that represents an accelerator pedal position. VSC 37 provides various output signals (i.e., commands) for controlling driver operation, e.g., desired wheel torque, desired engine speed, and generator brake command. A contactor control signal determined the activation of battery contactor relays (not shown).

Vehicle 10 may include a braking system which has a brake system control module (BSCM) 38 that communicates with VSC 37 to coordinate regenerative braking. Vehicle 10 may further include an engine control module (ECM) 39 for controlling ICE 11. VSC 37 provides a desired engine torque command to ECM 39 that is based on a number of input signals including the driver's demand for vehicle propulsion.

Figure 2:
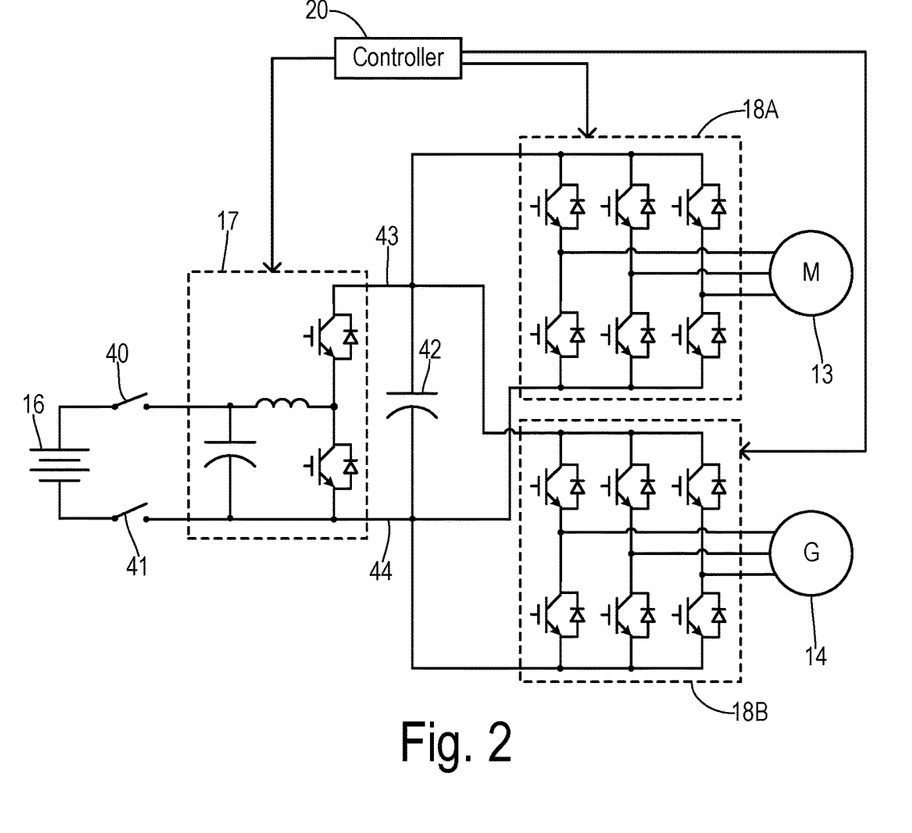
FIG. 2 is a schematic, block diagram showing an electric drive portion of a hybrid electric vehicle.

FIG. 2 is an electrical schematic showing one preferred embodiment of an electric drive system useful with a powersplit hybrid drive. Battery 16 is coupled by contactor relay switches 40 and 41 to VVC 17. A main linking capacitor 42 is connected to an output of VVC 17 establishing a positive bus 43 and a negative bus 44. A motor inverter 18A and a generator inverter 18B are coupled between the buses. Inverters 18A and 18B are each comprised of a plurality of switching devices (such as insulated gate bipolar transistors, IGBTs) in a bridge configuration. Switches in inverters 18A and 18B and in VVC 17 are driven according to control signals from controller 20 in a conventional manner (e.g., using pulse width modulation).

Figure 3:
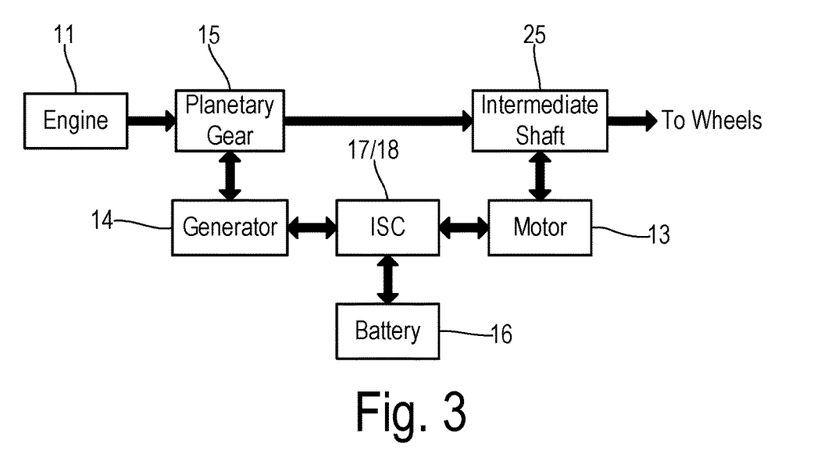
FIG. 3 is a block diagram showing a power flow in a powersplit hybrid drive system.

FIG. 3 shows normal power flow paths between the various elements of the powersplit powertrain. Power flow between various components is bi-directional, depending on an operating mode (e.g., regenerative braking). Engine power delivered to planetary gearset 15 can be split between generator 14 (e.g., for charging battery 16 or powering motor 13) and intermediate shaft 25 (e.g., for rotating the wheels) by controlling the generator torque, for example. Motor torque may be controlled according to the generator torque and a driver's torque command (i.e., torque demand via an accelerator pedal). During normal (i.e., non-faulted) operating conditions, electrical power flows in to or out from battery 16 under control of the inverter system components (VVC 17 and inverters 18). Using a measured voltage for the HV bus, the direction of power flow and the switching operation of VVC 17 are determined such that the HV bus voltage is regulated within a desired range.

Figure 4:
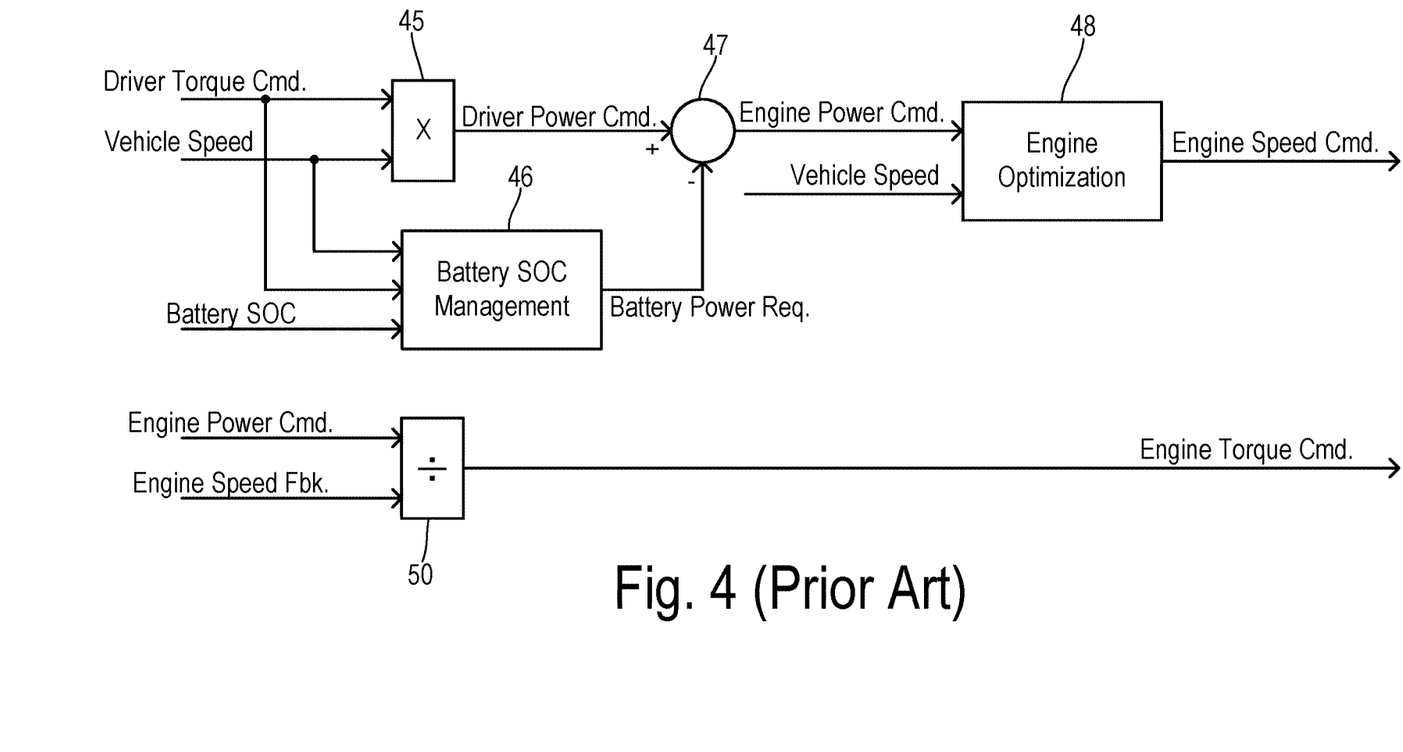
FIG. 4 is a block diagram showing a conventional control system for determining an engine speed command and an engine torque command.
Figure 5:
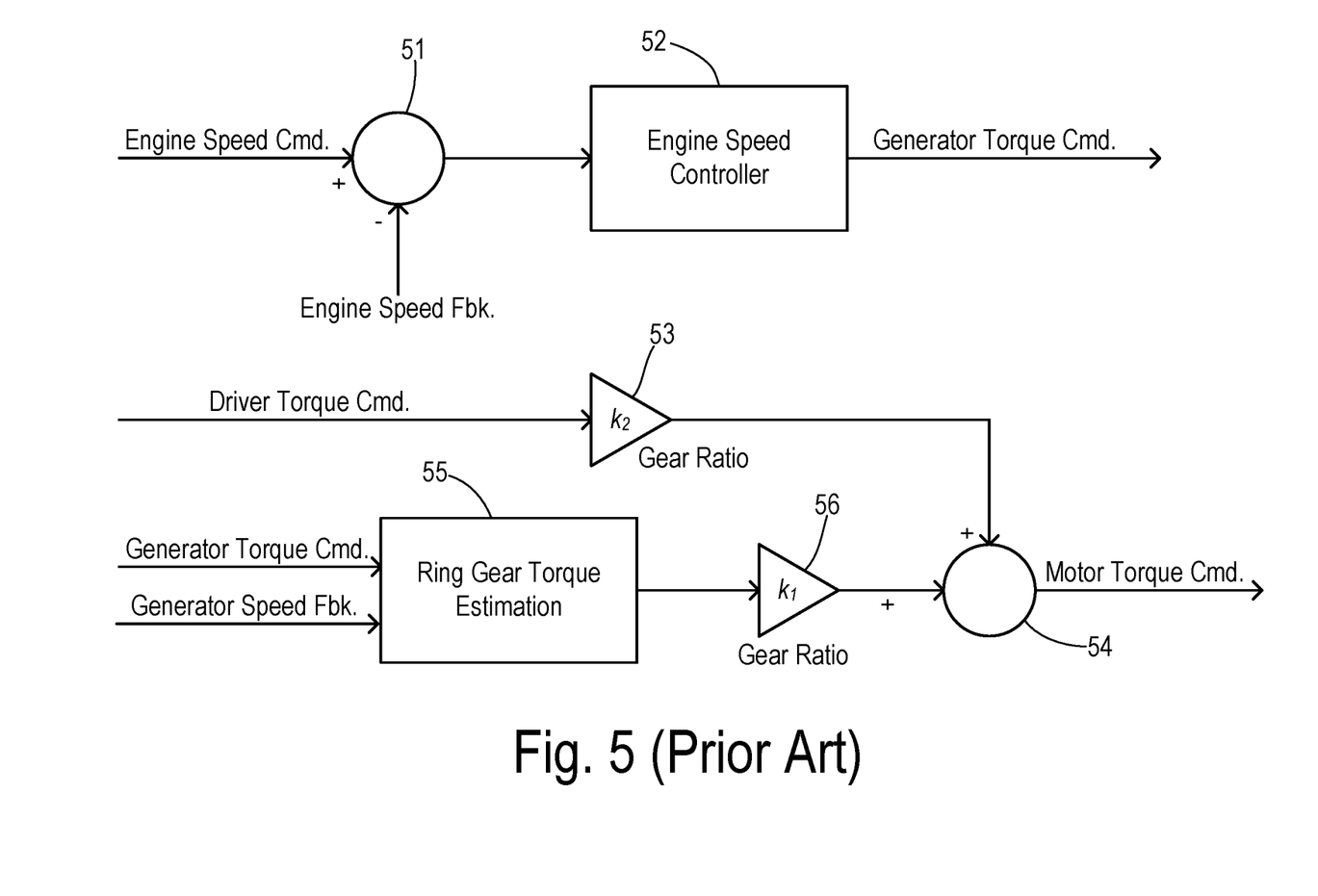
FIG. 5 is a block diagram showing a conventional control system for determining a generator torque command and a motor torque command.

Certain control operations utilized in a conventional drive system are shown in greater detail in FIGS. 4 and 5. Normal operation includes using a generator torque command to regulate engine speed, and a motor torque command is generated to meet the driver torque command. As shown in FIG. 4, electronic signals representing a driver torque command and a measured vehicle speed are provided to respective inputs of a multiplier 45 to produce a Driver Power Command which is coupled to an adding input of an adder 47. A signal representing a battery state of charge (SOC) and the signals representing driver torque command and measured vehicle speed are provided to respective inputs of a battery SOC management block 46 which uses known methods to provide a Battery Power Request that is coupled to a subtracting input of summer 47. The Driver Power Command represents a total power to be delivered to the vehicle wheels, and the output of summer 47 is an Engine Power Command. When battery SOC is high, then block 46 outputs a Battery Power Request which is positive (i.e., it is desired to utilize stored electrical power to propel the vehicle). When the Driver Power Command is low, then the vehicle may be driven using only battery power and the resulting Engine Power Command may be zero (i.e., engine off). At higher levels of Driver Power Command or when battery management results in a request for battery charging (i.e., Battery Power Request is negative), then the resulting Engine Power Command is positive. Using vehicle speed as an input, an engine optimization block 48 determines an Engine Speed Command that produces the desired engine power at a highest efficiency. In a divider 50, the Engine Power Command is converted to an Engine Torque Command by dividing by a measured Engine Speed Feedback signal. The Engine Torque Command may be transmitted to an engine controller for use in regulating the engine.

FIG. 5 illustrates a known manner of determining desired torques to be generated by the generator and motor in view of the engine torque and speed. Thus, the Engine Speed Command is coupled to a summing input of an adder 51. The measured engine speed is coupled to a subtracting input of summer 51. The error between the commanded and actual engine speed is input from summer 51 to an engine speed controller 52 which uses a conventional method for generating a Generator Torque Command (e.g., by modifying the Generator Torque Command, the engine speed is able to be regulated). The Generator Torque Command is used in a controller (e.g., the TCM) to control the generator inverter such that the desired generator torque is obtained. Engine speed controller 52 may be a proportional-integral controller, for example, and may be implemented within the TCM.

The Driver Torque Command is multiplied by a known gear ratio $k_2$ in an amplifier 53 and coupled to a summing input of an adder 54. The Generator Torque Command and a generator speed feedback are input to a ring gear torque estimator 55 and a resulting torque estimate is multiplied by another known gear ratio $k_1$ in an amplifier 56. The output of amplifier 56 is coupled to a summing input of adder 54 to produce the Motor Torque Command.

Figure 6:
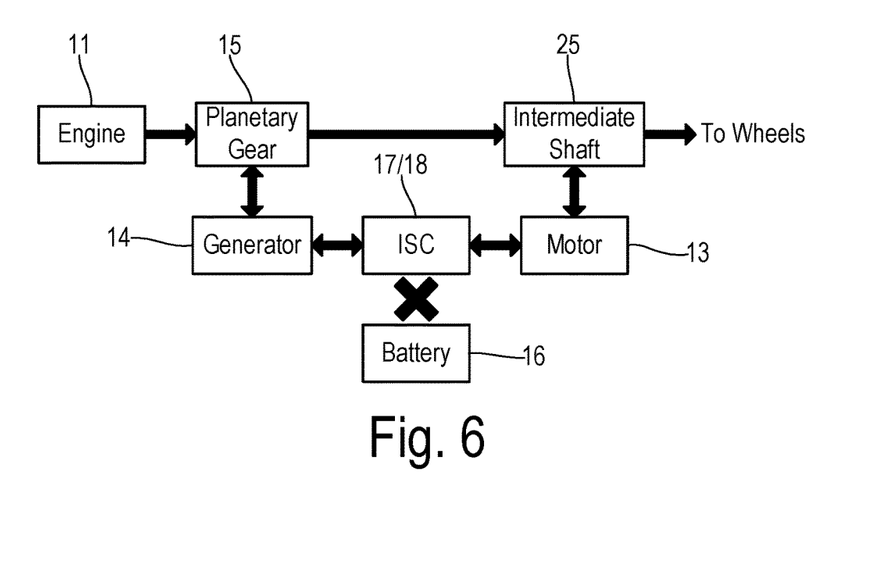
FIG. 6 is a block diagram showing a power flow in a powersplit hybrid drive system when a fault occurs making the VVC unavailable for regulating the HV bus voltage.

In the event that a fault occurs in which the battery and/or VVC become unavailable for regulating a bus voltage on the bus, it becomes necessary to cease use of the control strategy of FIGS. 4 and 5. FIG. 6 shows available power flow paths when the VVC is faulted. Battery 16 is no longer available to store excess power produced by generator 14 or motor 13. When the VVC fault occurs, the normal control strategy creates a power mismatch between the motor inverter and the generator inverter. The resulting extra power from the generator would charge the HV DC link capacitor very quickly to an undesirable overvoltage (e.g., over 1000 V), which can trigger a system OverVoltage (OV) protection fault that causes a shutdown of the drive system.

To avoid an undesirable shutdown, the present invention employs a fault-tolerant control regime during such a VVC/battery fault which regulates the motor inverter output power such that it substantially matches the generator inverter output power. More particularly, a HV bus voltage balance can be achieved by matching the motor inverter power to the generator inverter output power plus estimates of power losses occurring in the motor inverter and generator inverter.

Figure 7:
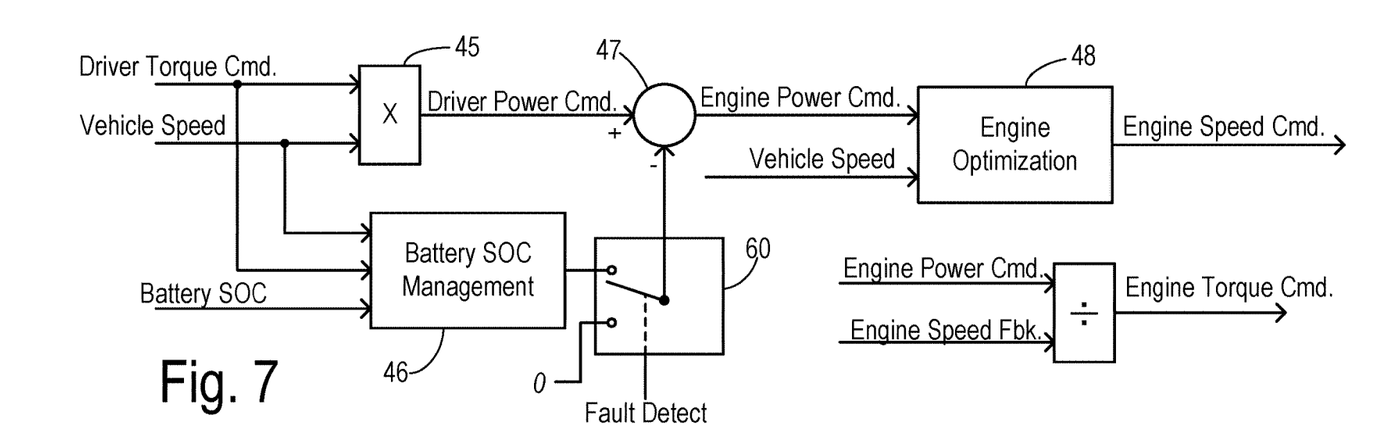
FIG. 7 is a block diagram showing one embodiment of a control system of the invention for determining an engine speed command and an engine torque command.
Figure 8:
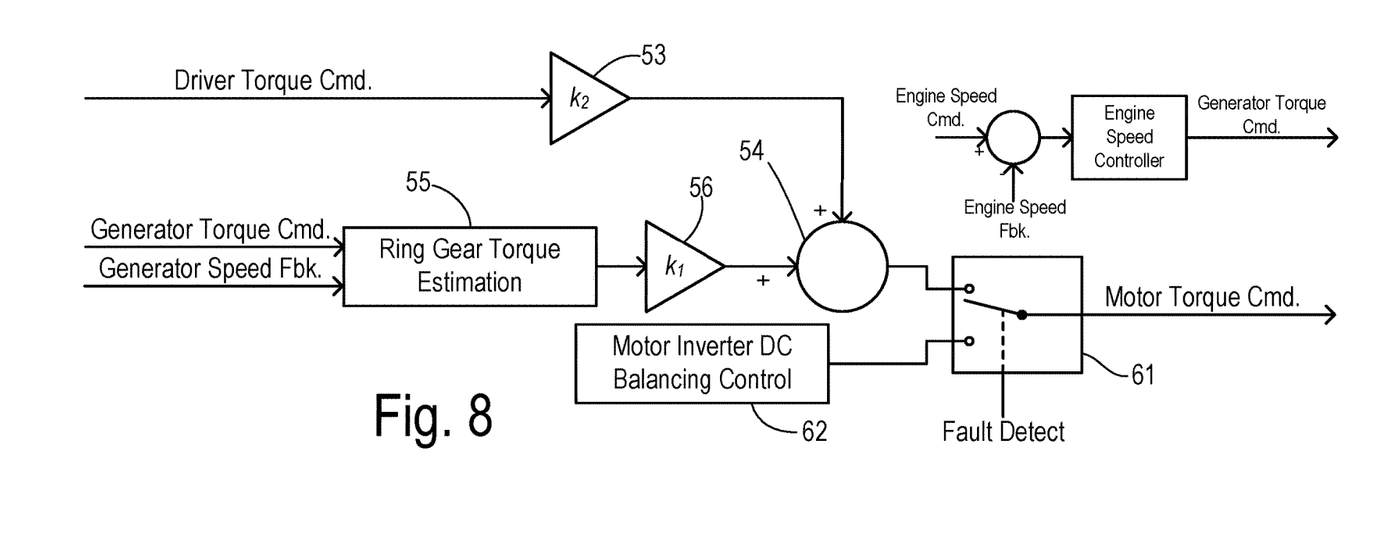
FIG. 8 is a block diagram showing one embodiment of a control system of the invention for determining a generator torque command and determining a motor torque command using a motor inverter DC balancing control.

FIGS. 7 and 8 illustrate respective changes made to the conventional control strategies of FIGS. 4 and 5. In FIG. 7, a selector switch 60 couples either the Battery Power Request from SOC management block 46 or a value of zero to the subtracting input of adder 47 depending on the state of a Fault Detect signal. When the VVC fault is present then the battery is isolated (i.e., no power can flow in or out of the battery) and the battery request must be set to zero during the fault. In FIG. 8, a selector switch 61 outputs either the result from adder 54 or an output from a motor inverter DC balancing control 62 as the Motor Torque Command depending on the state of the Fault Detect signal.

Figure 9:
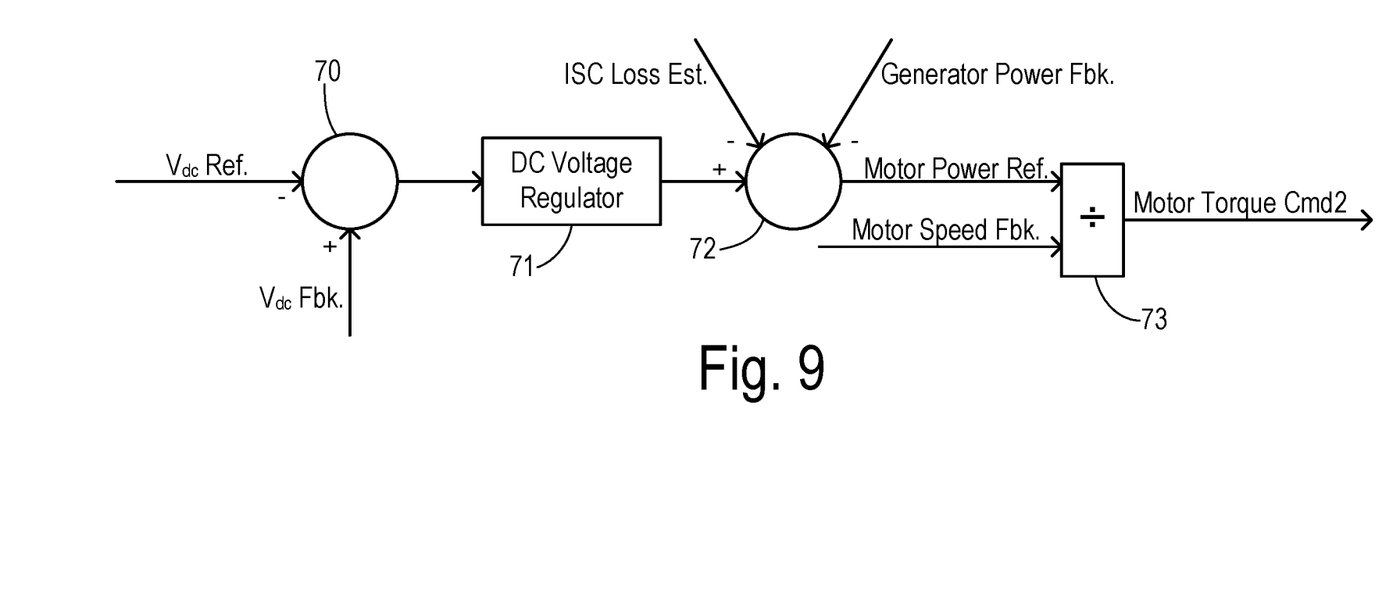
FIG. 9 is a block diagram showing one embodiment of the motor inverter DC balancing control.

Motor inverter DC balancing control 62 which controls the DC bus voltage by regulating the Motor Torque Command in shown in greater detail in FIG. 9. A desired reference voltage (Vac Ref) is subtracted from a measured value for the instantaneous voltage on the inverter bus (Vac Feedback) in an adder 70. The difference (i.e., voltage error) is input to a DC voltage regulator 71. Depending on the magnitude of the error (e.g., when it is outside a particular range around Vac Ref), regulator 71 generates a control signal which is coupled to an adding input of an adder 72. Respective subtracting inputs of adder 72 receive an ISC Loss Estimate signal and a Generator Power Feedback signal. The Loss Estimate signal can be obtained from an empirically-derived lookup table based on various operating parameters of the drive system (e.g., magnitude of currents flowing in the inverters and the voltages present at the switching bridges to characterized the switching losses). The Generator Power Feedback signal can be measured at the output of the generator inverter. The output of adder 72 provides a Motor Power Reference which represents the magnitude of motor power consumption that consumes just enough of the excess power coming from the generator inverter to maintain the bus voltage within a desired voltage range. The Motor Power Reference is converted to a Motor Torque Command by dividing by a Motor Speed Feedback signal in a divider 73.

Figure 10:
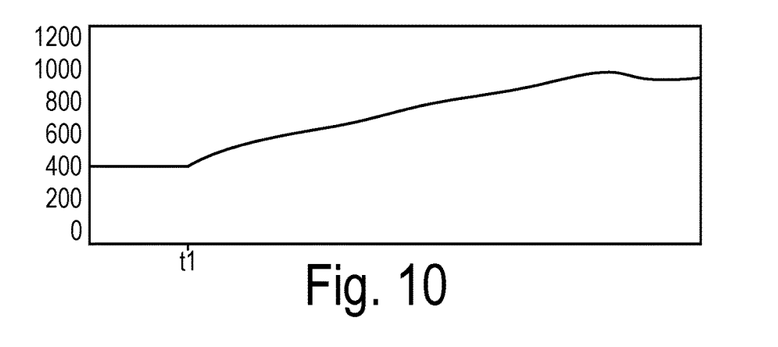
FIG. 10 is a graph showing a voltage on the HV bus during a fault condition of the VVC using a conventional controller.
Figure 11:
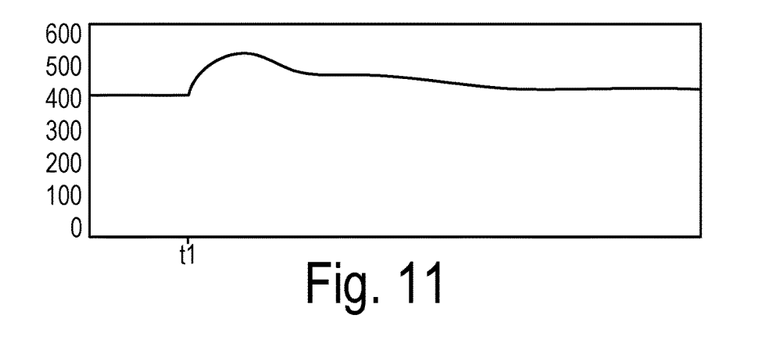
FIG. 11 is a graph showing a voltage on the HV bus during a fault condition of the VVC using a modified controller of the present invention.

FIG. 10 shows a plots of the bus voltage using the conventional control strategies of FIGS. 4 and 5. A VVC/battery fault occurs at a time ti. Since the bus voltage cannot be controlled by moving excess power into the battery, the bus voltage rises to unacceptable levels within a short time, and the vehicle drive system must be shut down. In contrast, FIG. 11 shows a plots of the bus voltage using the improved control strategies of FIGS. 7-9. A VVC/battery fault occurs at a time ti, but since the torque (i.e., power) generated by the generator is balanced by the torque load of the traction motor (plus the inverter power losses), the bus voltage is able to be maintained within the desired range. If sufficiently low, the inverter power losses can be ignored in some embodiments.

Figure 12:
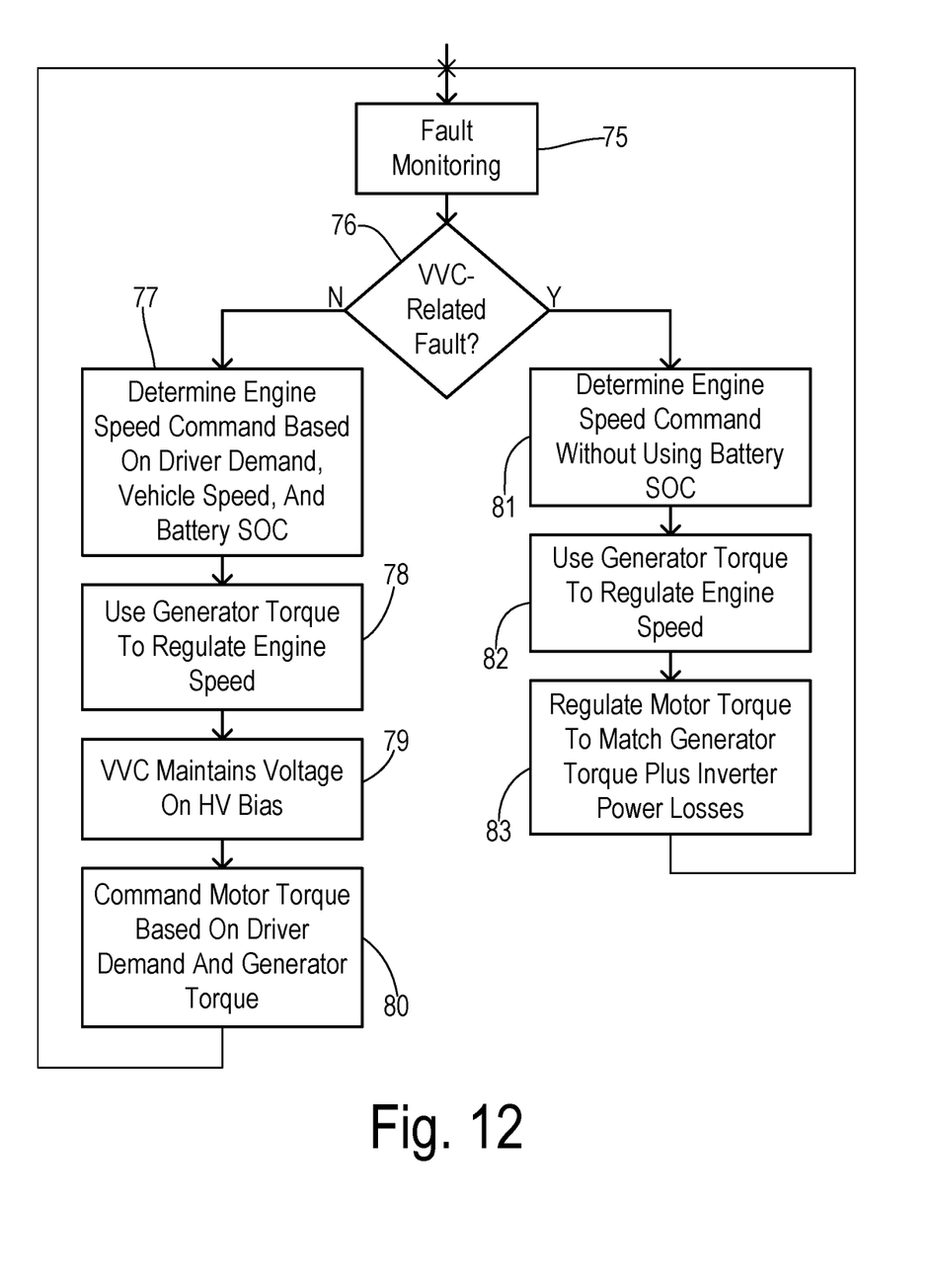
FIG. 12 is a flowchart showing one embodiment of a method of the present invention.

FIG. 12 shows one preferred method of the invention. In step 75, fault monitoring is performed. The monitored faults include any that may indicate that the battery and/or VVC are unavailable for regulating a bus voltage on the bus. A check is performed in step 76 to determine whether a VVC/battery-related fault has occurred. If not, then a controller for a powersplit hybrid drive system determines an engine speed command based on a driver torque demand, a vehicle speed, and a battery state of charge. An engine torque command is also determined in a conventional manner. In step 78, a commanded generator torque is used to regulate a speed of the combustion engine (i.e., the determined engine speed determines the generator torque command). During this nominal operation wherein no faults are present, conventional operation of the VVC maintains a desired voltage on the high voltage bus in step 79. In step 80, a motor torque command is determined based on the driver demanded torque and the commanded generator torque.

If a VVC/battery-related fault is detected in step 76, then the engine speed command and engine torque are determined in step 81 without regard to the battery state of charge. In step 82, the commanded generator torque continues to be used to regulate the speed of the combustion engine. In this faulted condition, the voltage on the inverter bus is regulated to a predetermined reference voltage by commanding the motor torque to match the commanded generator torque plus estimated power loss of the inverters in step 83. In particular, the method preferably regulates the motor inverter power output according to an error between the bus voltage and the predetermined voltage. The commanded motor torque command may be generated according to A) an error between the bus voltage and the predetermined voltage, B) a generator inverter power output, and C) optionally, according to the estimated power loss of the inverters.

In a preferred embodiment, the motor torque regulation is performed by a DC balancing control which comprises a voltage regulator providing a control signal according to a difference between the voltage at the inverter bus and the reference voltage whenever the bus is isolated from a vehicle battery. The DC balancing control includes a combiner which generates a motor inverter power target according to a difference between the control signal and a power output from the generator inverter. Consequently, a hybrid electric drive system can keep operating even under these fault conditions, which significantly decreases the severity of these faults and improves the system robustness and reliability. Moreover, this invention can be introduced without any added hardware components or cost.

What is claimed is:

1. A hybrid drive system comprising:
   a DC power source;
   an internal combustion engine;
   a traction motor;
   a generator;
   a variable voltage converter (VVC) selectably coupled to the power source;
   a motor inverter;
   a generator inverter;
   a bus coupling an output of the VVC to the inverters; and
   a controller regulating an engine speed, a motor torque, and a generator torque;
   wherein the controller detects a fault in which the power source and VVC are unavailable for regulating a bus voltage on the bus; and
   wherein upon detecting the fault, the controller regulates a motor inverter power output to match a sum of a generator inverter power output and an estimated power loss of the inverters.

2. The hybrid drive system of claim 1 wherein the controller further regulates the motor inverter power output according to an error between the bus voltage and a predetermined voltage.

3. The hybrid drive system of claim 1 wherein the DC power source is a battery pack, wherein the regulated engine speed is determined according to a state of charge of the battery pack when the fault is not detected, and wherein the controller regulates the engine speed without regard to the state of charge of the battery pack when the fault is detected.

4. A hybrid drive system comprising:
   a DC power source;
   an internal combustion engine;
   a traction motor;
   a generator;
   a variable voltage converter (VVC) selectably coupled to the power source;
   a motor inverter;
   a generator inverter;
   a bus coupling an output of the VVC to the inverters; and
   a controller regulating an engine speed, a motor torque, and a generator torque;
   wherein the controller detects a fault in which the power source and VVC are unavailable for regulating a bus voltage on the bus; and
   wherein upon detecting the fault, the controller generates a motor torque command according to A) an error between the bus voltage and a predetermined voltage, and B) a generator inverter power output.

5. The hybrid drive system of claim 4 wherein the controller further generates the motor torque command during detection of the fault according to an estimated power loss of the inverters.

6. The hybrid drive system of claim 4 wherein the DC power source is a battery pack, wherein the regulated engine speed is determined according to a state of charge of the battery pack when the fault is not detected, and wherein the controller regulates the engine speed without regard to the state of charge of the battery pack when the fault is detected.

7. A DC balancing control in a hybrid vehicle having a motor inverter and a generator inverter, comprising:
   a voltage regulator providing a control signal according to a difference between a voltage at an inverter bus and a reference voltage when the bus is isolated from a vehicle battery; and
   a combiner generating a motor inverter power target according to a difference between the control signal and a power output from the generator inverter.

8. The control of claim 7 wherein the combiner generates the motor inverter power target according to a difference between the control signal and a sum of the power output from the generator inverter and an estimated power loss of the inverters.

9. The control of claim 7 further comprising a command generator converting the power target to a motor torque command using a motor speed.

10. A method of controlling a hybrid drive system having a battery, an internal combustion engine, a traction motor, a generator, a variable voltage converter (VVC) selectably coupled to the battery, a motor inverter, a generator inverter, a bus coupling an output of the VVC to the inverters, and a controller, the method comprising the steps of:
    detecting whether the battery and VVC are available for regulating a voltage on the bus;
    when the battery and VVC are available, then performing the steps of:
       determining an engine speed command according to a driver torque command, an actual vehicle speed, and a battery state of charge;
       regulating engine speed to the engine speed command by modifying a generator torque command for the generator inverter; and
       determining a motor torque command for the motor inverter according to the driver torque command and the generator torque command; and
    when the battery and VVC are not available, then performing the steps of:
       determining an engine speed command according to the driver torque command and the actual vehicle speed, without regard to the battery state of charge;

regulating engine speed to the engine speed command by modifying a generator torque command for the generator inverter; and regulating the motor torque command to obtain a motor power output that matches a power loss of the inverters plus a generator power output that results from the modified generator torque command.

11. The method of claim 10 wherein the matching motor power output is determined by the steps of:

using a voltage regulator to generate a control signal according to a difference between a voltage at the bus and a reference voltage with the bus being isolated from the battery; and generating a motor inverter power target according to a difference between the control signal and the generator power output.

12. The method of claim 11 wherein the motor inverter power target is further determined according to the power loss of the inverters.

\* \* \* \* \*